(12) United States Patent
Chuang

(10) Patent No.: US 7,431,263 B2
(45) Date of Patent: Oct. 7, 2008

(54) SOLENOID ARRANGEMENT

(75) Inventor: Shih Fen Chuang, Changhua Hsien (TW)

(73) Assignee: Shin Shin Technology Co., Ltd., Hsiushui Changhua Hsien (TW)

( * ) Notice: Subject to any disclaimer, the term of this patent is extended or adjusted under 35 U.S.C. 154(b) by 160 days.

(21) Appl. No.: 11/501,933

(22) Filed: Aug. 9, 2006

(65) Prior Publication Data

US 2008/0035871 A1 Feb. 14, 2008

(51) Int. Cl.
*F16K 31/02* (2006.01)

(52) U.S. Cl. .............................. 251/129.19; 251/129.15

(58) Field of Classification Search ............ 251/129.15, 251/129.19, 77
See application file for complete search history.

(56) References Cited

U.S. PATENT DOCUMENTS

| | | | | |
|---|---|---|---|---|
| 3,755,700 A | * | 8/1973 | Buschmann et al. | 310/30 |
| 4,403,765 A | * | 9/1983 | Fisher | 251/65 |
| 4,679,767 A | | 7/1987 | Vollmer et al. | 251/129.15 |
| 4,697,608 A | | 10/1987 | Kolze et al. | 137/1 |
| 5,584,466 A | * | 12/1996 | Fukano et al. | 251/65 |
| 6,637,724 B1 | * | 10/2003 | Mayer | 251/129.15 |
| 6,715,475 B2 | * | 4/2004 | Cook | 123/568.21 |

* cited by examiner

*Primary Examiner*—John K Fristoe, Jr.
(74) *Attorney, Agent, or Firm*—Charles E. Baxley

(57) ABSTRACT

A solenoid arrangement includes an electromagnetic valve device having a coil disposed in a casing, and a movable armature slidably received in the coil for allowing the movable armature to be actuated by the coil to move relative to the coil and the casing, the casing includes a sleeve having a bore for slidably and changeably receiving shanks of different lengths which may be attracted to the movable armature for being moved in concert with the movable armature. The electromagnetic valve device may be adjusted to different moving strokes with different shanks for attaching or coupling to different operating facilities that require different moving strokes.

8 Claims, 4 Drawing Sheets

SOLENOID ARRANGEMENT

BACKGROUND OF THE INVENTION

1. Field of the Invention

The present invention relates to a solenoid arrangement, and more particularly to a solenoid arrangement including an adjustable structure for selectively adjusting or changing the moving stroke of the solenoid arrangement and for allowing the solenoid arrangement to be secured or attached or coupled to different devices that require different moving strokes.

2. Description of the Prior Art

Typical solenoid arrangements or electromagnetic valve devices comprise a coil of electrically conductive wire having a bore formed therein for slidably receiving a plunger core therein and for actuating the plunger core to move relative to the coil or to move into and out of the coil.

For example, U.S. Pat. No. 4,697,608 to Kolze et al. discloses one of the typical electromagnetic valve assemblies comprising an encapsulated electrical coil mounted on a solenoid body, and a plunger core or an armature member slidably received in the encapsulated electrical coil for being actuated or operated by the encapsulated electrical coil to move relative to the encapsulated electrical coil.

However, normally, the plunger core or the armature member includes a predetermined length that may not be changed to different lengths such that the typical electromagnetic valve assemblies may not be secured or attached or coupled to different devices that require different moving strokes.

U.S. Pat. No. 4,697,767 to Vollmer et al. discloses another typical electromagnetic valve assembly or solenoid arrangement also comprising a coil of electrically conductive wire and a yoke of magnetic material surrounding the coil, a stationary armature extends into a spool upon which the coil is wound, and a movable armature slidably received or engaged in the coil for being actuated or operated by the coil to move relative to the coil.

However, similarly, the movable armature also includes a predetermined length that may not be changed to different lengths such that the typical solenoid arrangement also may not be secured or attached or coupled to different devices or facilities that require different moving strokes.

The present invention has arisen to mitigate and/or obviate the afore-described disadvantages of the conventional solenoid arrangements.

SUMMARY OF THE INVENTION

The primary objective of the present invention is to provide a solenoid arrangement including an adjustable structure for selectively adjusting or changing to different moving strokes and for allowing the solenoid arrangement to be secured or attached or coupled to different devices or facilities that require different moving strokes.

In accordance with one aspect of the invention, there is provided a solenoid arrangement comprising an electromagnetic valve device including a casing, a coil disposed in the casing, and a movable armature slidably received in the coil for allowing the movable armature to be actuated by the coil to move relative to the coil and the casing, the casing including a sleeve attached to one end thereof and having a bore formed therein, and a shank slidably received in the bore of the sleeve and attracted to the movable armature for being moved in concert with the movable armature for allowing the shank to be changed with the new ones when the previous shank has been damaged, for example.

The electromagnetic valve device including a spring member disposed in the casing and engaged with the movable armature for biasing and moving the movable armature relative to the coil and the casing. The electromagnetic valve device including a stationary armature disposed in the casing and engaged with the spring member, and the spring member is disposed between the stationary armature and the movable armature.

An operating facility may further be provided, and the sleeve of the casing is provided for coupling to the operating facility. The sleeve of the casing includes an outer thread for engaging with the operating facility.

The casing includes a lock nut threaded with the outer thread of the sleeve of the casing. The operating facility includes a valve opening formed therein, and a valve device for selectively enclosing and opening the valve opening of the operating facility.

The valve device includes a moveable rod and a valve member attached to the rod and moveable toward and away from the valve opening of the operating facility for selectively enclosing and opening the valve opening of the operating facility. The valve device includes a spring member engaged onto the rod for biasing the rod of the valve device to engage with the shank and thus for further positioning the shank to the movable armature.

The electromagnetic valve device including at least one shank selectively and changeably received in the bore of the sleeve and attracted to the movable armature when the shank is removed from the sleeve. The shank includes a length different from that of the shank.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
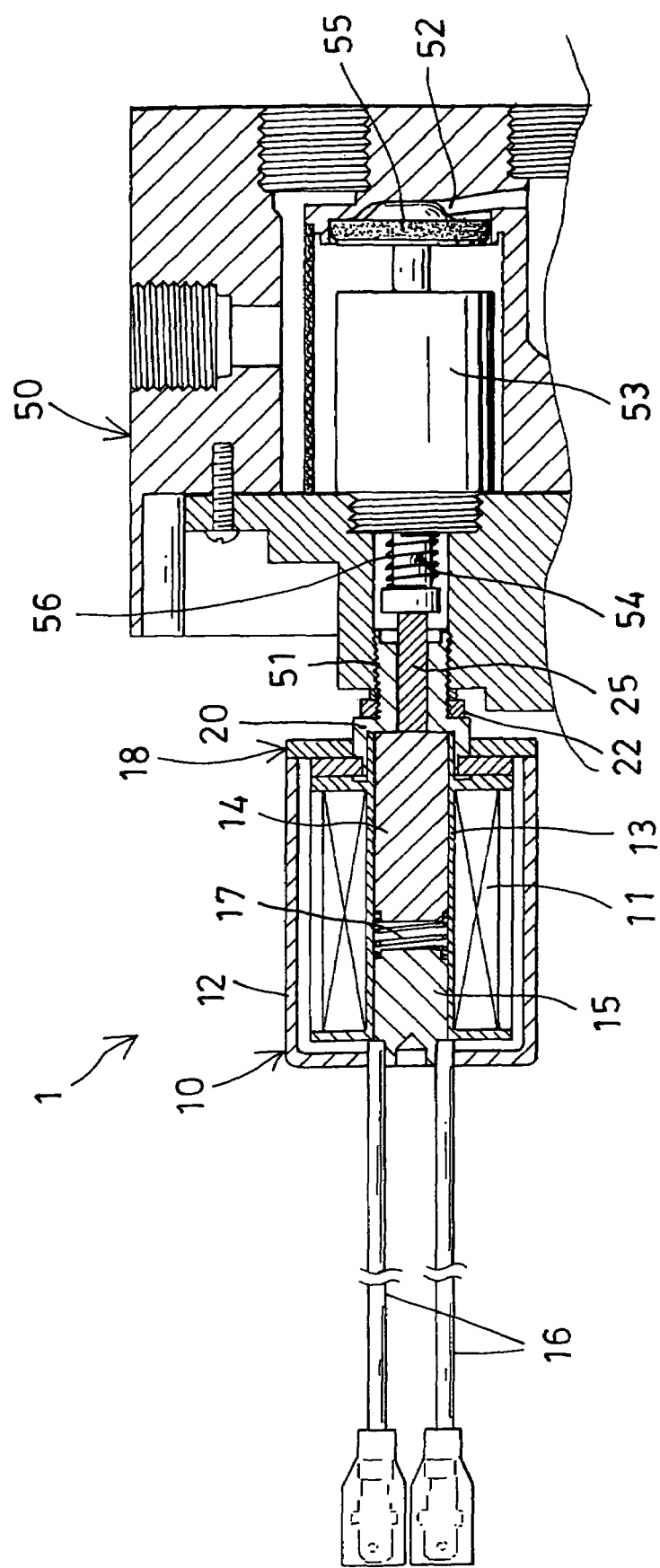
FIG. 1 is a partial cross sectional view of a solenoid arrangement in accordance with the present invention.
Figure 2:
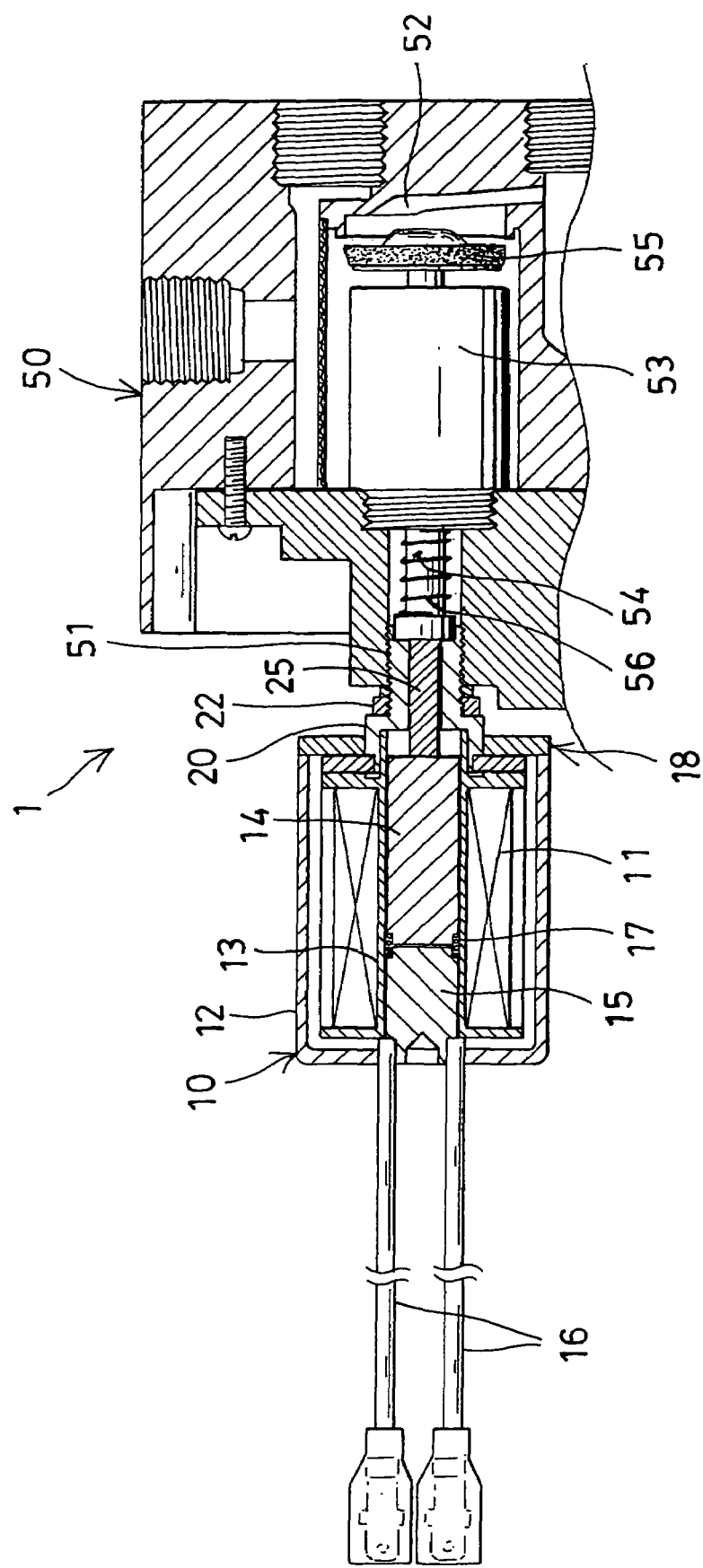
FIG. 2 is a partial cross sectional view similar to FIG. 1, illustrating the operation of the solenoid arrangement.
Figure 3:
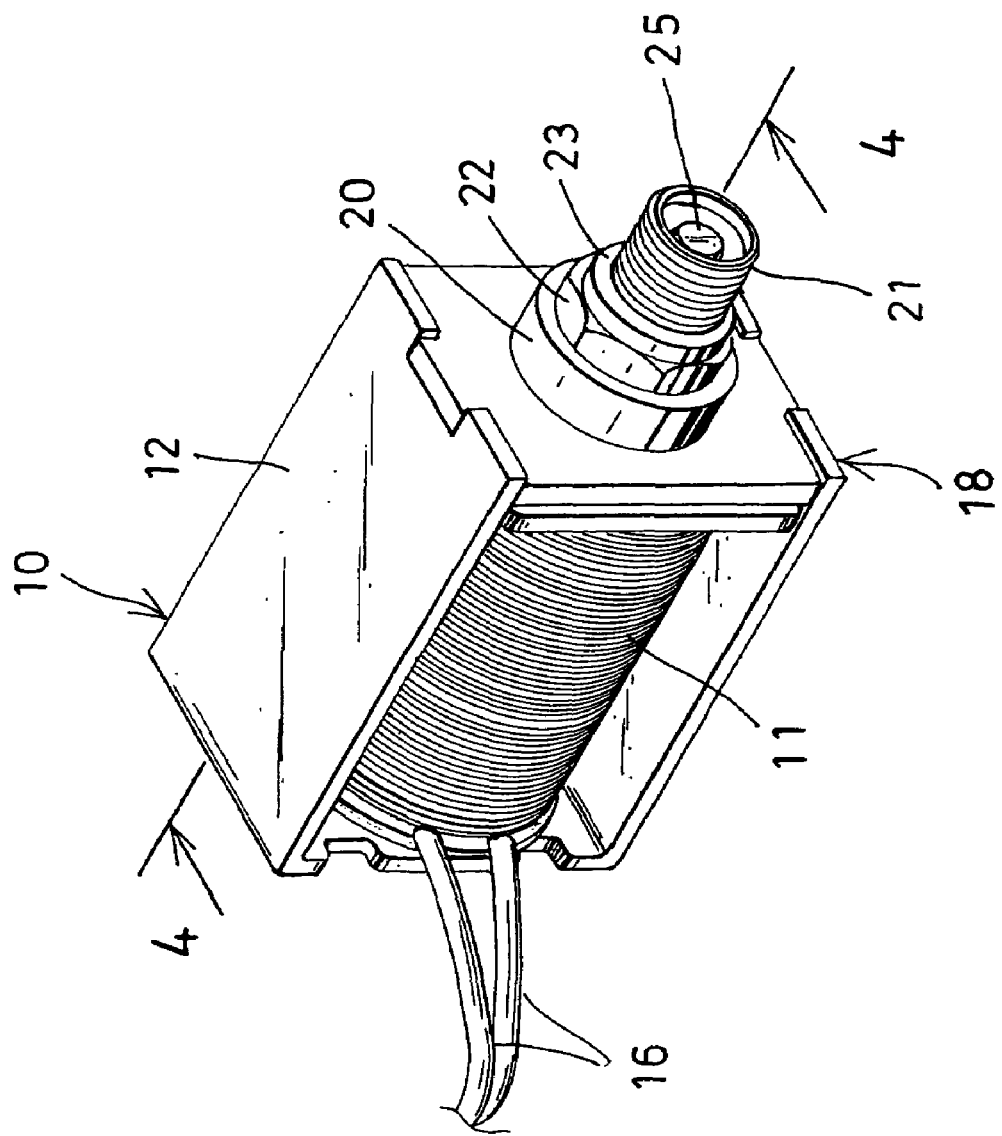
FIG. 3 is a perspective view illustrating a portion of the solenoid arrangement.

Referring to the drawings, and initially to FIGS. 1 and 2, a solenoid arrangement 1 in accordance with the present invention comprises an electromagnetic valve device 10 including a coil 11 of electrically conductive wire disposed or engaged in a yoke or casing 12, a spool 13 disposed or engaged in the center or middle portion of the casing 12 for slidably receiving a plunger core or movable armature 14 therein and for allowing the movable armature 14 to be actuated or operated by the coil 11 to move relative to the coil 11 or to move into and out of the spool 13 of the coil 11. The electromagnetic valve device 10 may further include a stationary armature 15 selectively extends into the spool 13 upon which the coil 11 is wound.

For example, the stationary armature 15 may include one or more terminals or cables 16 for coupling to such as the electric energy or power source (not shown) and for allowing the coil 11 or the electromagnetic valve device 10 to be suitably energized or actuated. The electromagnetic valve device 10 may further include a spring member 17 disposed or engaged between the stationary armature 15 and the movable armature 14 and arranged for allowing the movable armature 14 to be biased or moved away from the stationary armature 15 when the coil 11 has not been energized or actuated or operated. The spring member 17 will be compressed by the movable armature 14 when the movable armature 14 is actuated or operated or moved by the coil 11.

Figure 4:
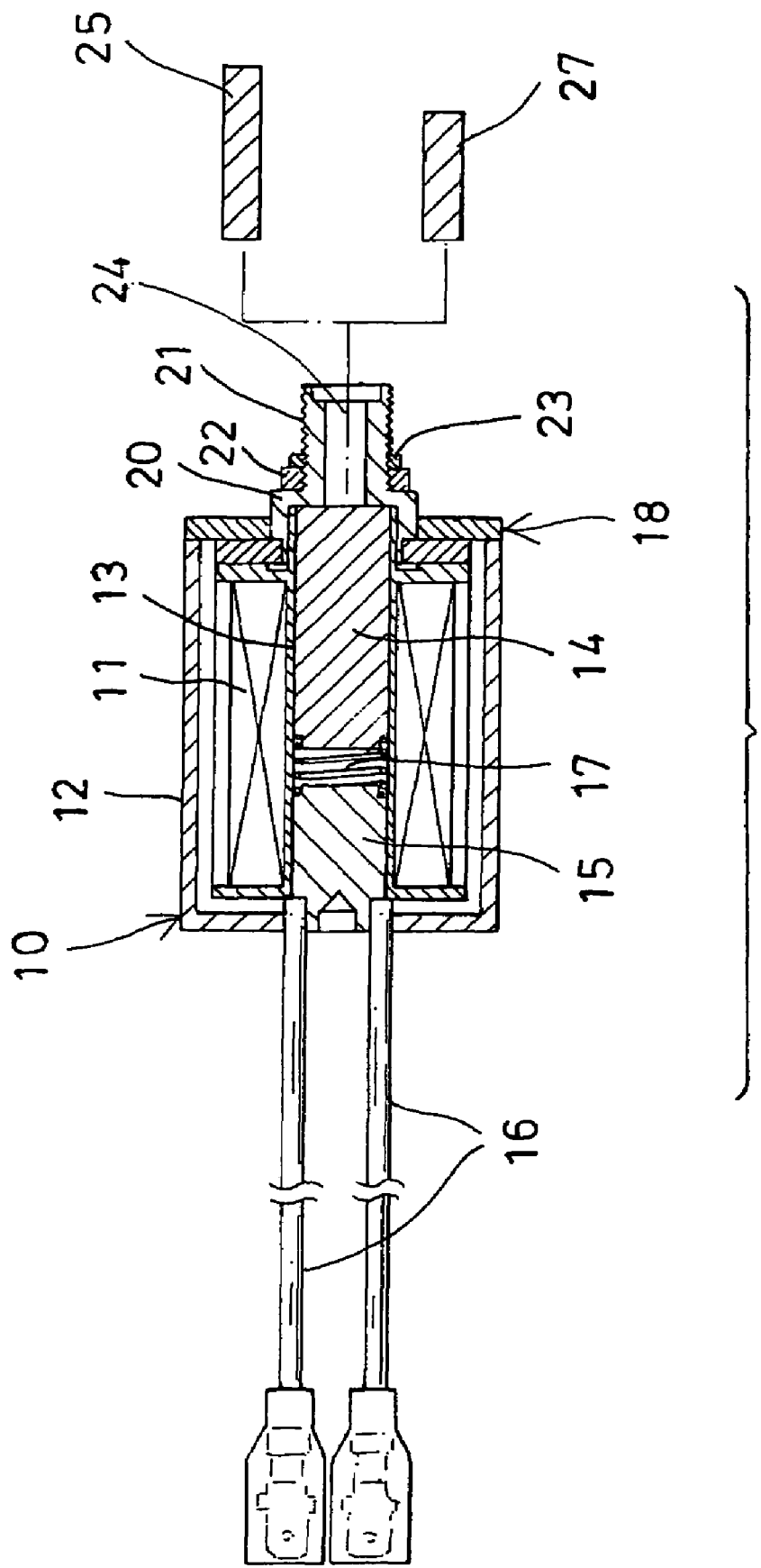
FIG. 4 is a partial cross sectional and exploded view of the solenoid arrangement taken along lines 4-4 of FIG. 3.

The electromagnetic valve device 10 further includes a tubular sleeve 20 extended from or attached or secured to one end 18 of the casing 12 with such as fasteners or latches (not shown), adhesive materials, or by welding processes, and the tubular sleeve 20 includes an outer thread 21 formed or provided on the outer peripheral portion thereof for threading or engaging with a lock member or lock nut 22, a washer 23 may further be provided and engaged onto the tubular sleeve 20 and engaged with the lock nut 22. The tubular sleeve 20 includes a bore 24 formed therein, and the electromagnetic valve device 10 further includes one or more shanks 25, 27 of different lengths for selectively or adjustably or changeably and slidably received or engaged into the bore 24 of the tubular sleeve 20 (FIG. 4).

The shanks 25, 27 are made of electrically conductive materials or magnetically attractive materials for acting with the movable armature 14 and arranged for allowing the shanks 25, 27 to be attracted and secured to the movable armature 14 by the magnetically attractive force or the electromagnetically attractive force of the movable armature 14 and thus for allowing the shanks 25, 27 to be moved in concert with the movable armature 14 or for allowing the shanks 25, 27 to be moved relative to the coil 11 or the casing 12 or the spool 13 of the coil 11 by the movable armature 14. The moving strokes of the movable armature 14 may thus be adjusted or changed to different moving strokes when the shanks 25, 27 of different lengths are adjustably or changeably attached or coupled to the movable armature 14.

As shown in FIGS. 1 and 2, the outer thread 21 of the tubular sleeve 20 of the electromagnetic valve device 10 may be selectively engaged with or coupled to such as a threaded port 51 of a valve or operating device or facility 50, such as a gas control valve facility, a vehicle head light facility, an electromagnetic lock facility, a flow or tubular control facility, etc., in which the operating facility 50 includes a valve seat or valve opening 52 to be selectively enclosed or opened or controlled by a valve device 53. For example, the valve device 53 includes a moveable stem or rod 54 slidably received therein, and a valve member 55 attached or secured to one end of the rod 54 and moveable toward and away from the valve opening 52 of the operating facility 50 for selectively enclosing or opening the valve opening 52 of the operating facility 50, and a spring member 56 disposed or engaged onto the rod 54.

As also shown in FIG. 1, either of the shanks 25, 27 and the movable armature 14 may be biased or moved to engage with the rod 54 of the valve device 53 by such as the spring member 17 and to move the rod 54 of the valve device 53 against the spring member 56 in order to force or to move the valve member 55 to selectively enclose or open the valve opening 52 of the operating facility 50 and thus to control a fluid to flow through the valve opening 52 of the operating facility 50. In operation, as shown in FIG. 2, when the coil 11 is energized or actuated or operated to move or to force the movable armature 14 to move relative to the coil 11 or the casing 12 or the spool 13 of the coil 11 against the spring member 17, the shank 25 that is attracted or secured to the movable armature 14 may also be caused to move relative to the coil 11 or the casing 12 or the spool 13 by the movable armature 14 or by the spring member 56. The spring member 56 may also bias the rod 54 of the valve device 53 to engage with the shanks 25, 27.

It is to be noted that the shanks 25, 27 of different lengths are not solidly secured to the movable armature 14 and may be selectively or adjustably or changeably attached or coupled or attracted to the movable armature 14 for allowing the moving stroke or distance of the electromagnetic valve device 10 relative to the operating facility 50 to be adjusted or changed to different moving strokes or distances relative to the operating facility 50 and thus for allowing the electromagnetic valve device 10 to be coupled to and to operate the operating facility 50 that requires different moving strokes. The shanks 25, 27 may also be changed or replaced with the new ones when the previous shanks 25, 27 have been damaged, for example.

Accordingly, the solenoid arrangement in accordance with the present invention includes an adjustable structure for selectively adjusting or changing to different moving strokes and for allowing the solenoid arrangement to be secured or attached or coupled to different devices or facilities that require different moving strokes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solenoid arrangement comprising:
an electromagnetic valve device including a casing, a coil disposed in said casing, and a movable armature slidably received in said coil for allowing said movable armature to be actuated by said coil to move relative to said coil and said casing,
said casing including a sleeve attached to one end thereof and having a bore formed therein,
a shank slidably received in said bore of said sleeve and attracted to said movable armature for being moved in concert with said movable armature, and
an operating facility, said sleeve of said casing being provided for coupling to said operating facility, said operating facility including a valve opening formed therein, and a valve device for selectively enclosing and opening said valve opening of said operating facility, said valve device including a moveable rod and a valve member attached to said rod and moveable toward and away from said valve opening of said operating facility for selectively enclosing and opening said valve opening of said operating facility.

2. The solenoid arrangement as claimed in claim 1, wherein said electromagnetic valve device including a spring member disposed in said casing and engaged with said movable armature for biasing and moving said movable armature relative to said coil and said casing.

3. The solenoid arrangement as claimed in claim 2, wherein said electromagnetic valve device including a stationary armature disposed in said casing and engaged with said spring member, and said spring member is disposed between said stationary armature and said movable armature.

4. The solenoid arrangement as claimed in claim 1, wherein said sleeve of said casing includes an outer thread for engaging with said operating facility.

5. The solenoid arrangement as claimed in claim 4, wherein said casing includes a lock nut threaded with said outer thread of said sleeve of said casing.

6. The solenoid arrangement as claimed in claim 1, wherein said valve device includes a spring member engaged onto said rod for biasing said rod of said valve device to engage with said shank.

7. The solenoid arrangement as claimed in claim 1, wherein said electromagnetic valve device including at least one shank selectively and changeably received in said bore of said sleeve and attracted to said movable armature when said shank is removed from said sleeve.

8. The solenoid arrangement as claimed in claim 7, wherein said at least one shank includes a length different from that of said shank.

* * * * *